US005575845A

United States Patent [19]

Belmont et al.

[11] Patent Number: 5,575,845
[45] Date of Patent: Nov. 19, 1996

[54] CARBON BLACK PRODUCTS FOR COLORING MINERAL BINDERS

[75] Inventors: James A. Belmont, Acton; Ralph U. Boes, West Concord; Jameel Menashi, Lexington, all of Mass.

[73] Assignee: Cabot Corporation, Boston, Mass.

[21] Appl. No.: 356,664

[22] Filed: Dec. 15, 1994

[51] Int. Cl.$^6$ .......................... C04B 14/00; C04B 14/36
[52] U.S. Cl. .................. 106/712; 106/472; 106/473; 106/476; 106/478; 423/449.2; 423/449.3
[58] Field of Search .................. 106/472, 473, 106/476, 712, 478; 423/445 R, 460, 449.2, 449.3

[56] References Cited

U.S. PATENT DOCUMENTS

| | | |
|---|---|---|
| T860,001 | 3/1969 | Gessler et al. . |
| 2,121,535 | 6/1938 | Amon ........................ 106/473 |
| 2,156,591 | 5/1939 | Jacobson . |
| 2,502,254 | 3/1950 | Glassman . |
| 2,514,236 | 7/1950 | Glassman ........................ 106/476 |
| 2,625,492 | 1/1953 | Young . |
| 2,793,100 | 5/1957 | Weihe . |
| 2,833,736 | 5/1958 | Glaser . |
| 3,011,902 | 12/1961 | Jordan . |
| 3,025,259 | 3/1962 | Watson et al. ........................ 523/215 |
| 3,043,708 | 7/1962 | Watson et al. ........................ 106/476 |
| 3,335,020 | 8/1967 | Aboytes et al. ........................ 106/476 |
| 3,479,300 | 11/1969 | Rivin et al. ........................ 502/168 |
| 3,528,840 | 9/1970 | Aboytes . |
| 3,607,813 | 9/1971 | Purcell . |
| 3,674,670 | 7/1972 | Erikson et al. . |
| 3,686,111 | 2/1972 | Makhlouf et al. . |
| 3,846,141 | 11/1974 | Ostergren et al. . |
| 3,876,603 | 4/1975 | Makhlouf . |
| 4,003,751 | 1/1977 | Carder . |
| 4,006,031 | 2/1977 | Ferch et al. ........................ 106/473 |
| 4,014,833 | 3/1977 | Story . |
| 4,014,844 | 3/1977 | Vidal et al. ........................ 524/560 |
| 4,061,830 | 12/1977 | Greenberg . |
| 4,176,361 | 11/1979 | Kawada et al. . |
| 4,204,871 | 5/1980 | Johnson et al. . |
| 4,204,876 | 5/1980 | Bowden ........................ 106/645 |
| 4,290,072 | 9/1981 | Manusukhani . |
| 4,293,394 | 10/1981 | Darlington et al. . |
| 4,308,061 | 12/1981 | Iwahashi et al. . |
| 4,328,041 | 5/1981 | Wilson ........................ 106/429 |
| 4,442,256 | 4/1984 | Miller . |
| 4,451,597 | 5/1984 | Victorius . |
| 4,476,270 | 10/1984 | Brasen et al. . |
| 4,478,905 | 10/1984 | Neely, Jr. . |
| 4,503,174 | 3/1985 | Vasta . |
| 4,503,175 | 3/1985 | Houze et al. . |
| 4,525,521 | 6/1985 | Denhariog . |
| 4,525,570 | 6/1985 | Blum et al. . |
| 4,530,961 | 7/1985 | Nguyen et al. ........................ 524/832 |
| 4,544,687 | 10/1985 | Schupp et al. . |
| 4,555,535 | 11/1985 | Bednarek et al. . |
| 4,556,427 | 12/1985 | Lewis . |
| 4,597,794 | 7/1986 | Ohta et al. . |

(List continued on next page.)

FOREIGN PATENT DOCUMENTS

| | | |
|---|---|---|
| 0006190 | 1/1980 | European Pat. Off. . |
| 272127 | 6/1988 | European Pat. Off. . |
| 433229 | 6/1991 | European Pat. Off. . |
| 410152 | 2/1994 | European Pat. Off. . |
| 636591 | 2/1995 | European Pat. Off. . |
| 1164786 | 10/1958 | France . |
| 72775 | 4/1960 | France . |
| 1215895 | 4/1960 | France . |
| 1224131 | 4/1960 | France . |
| 1331889A | 7/1963 | France . |
| 2477593 | 11/1981 | France . |
| 2564489 | 7/1986 | France . |
| 2607528 | 6/1988 | France . |
| 2426266A | 12/1975 | Germany . |
| 3170748 | 7/1985 | Germany . |
| 59/82467 | 5/1984 | Japan . |
| 1/275666 | 11/1989 | Japan . |
| 5/271365 | 8/1993 | Japan . |
| 5339516 | 12/1993 | Japan . |
| 6/025572 | 2/1994 | Japan . |
| 6025572 | 2/1994 | Japan . |
| 6067421 | 3/1994 | Japan . |
| 6073235 | 3/1994 | Japan . |
| 862018 | 3/1961 | United Kingdom . |
| WO92/13983 | 8/1992 | WIPO . |
| 0441987 | 8/1992 | WIPO . |

OTHER PUBLICATIONS

Belmont, USSN 08/356,660, filed Dec. 15, 1994.
Belmont et al., USSN 08/356,462, filed Dec. 15, 1994.
Belmont et al., USSN 08/356,459, filed Dec. 15, 1994.
Belmont et al., USSN 08/356,460, filed Dec. 15, 1994.
Belmont, USSN 08/356,653, filed Dec. 15, 1994.
S. Wolff et al., "The Influence of Modified carbon Blacks on Viscoelastic Compound Properties" Kautschuk & Gummi, Kunststoffe 44, Jahrgang, Nr. Oct. 1991, pp. 941–947.
C. Bourdillon, "Immobilization of glucose oxidase on a carbon surface derivatized by electrochemical reduction of diazonium salts" J. Electroanal. Chem., 336 (1992) 113–123. (no month).
S. E. Moschopedis et al., "the Reaction of Diazonium Salts with Humic Acids and Coals: Evidence for Activated Methylene Bridges in Coals and Humic Acids" Fuel 43(4) at pp. 289–298 (1964). (no month).
Ullmann's Encyclopedia of Industrial Chemistry, vol. A8, pp. 508–509. Date Unknown.
J. B. Donnet et al., "Chimie Superficielle Et Sites Privilégiés Des Charges Fines" Conference presentee aux Journees du Caoutehoue, Conference Internationale des Arts Chimigues, 22–23, pp. 5–12, (Jun. 1959).

(List continued on next page.)

Primary Examiner—Mark L. Bell
Assistant Examiner—Michael Marcheschi

[57] ABSTRACT

A mineral binder composition having incorporated therein a carbon black product comprising a carbon black having attached an organic group containing an ionic or an ionizable group.

11 Claims, No Drawings

U.S. PATENT DOCUMENTS

| | | |
|---|---|---|
| 4,605,596 | 8/1986 | Fry . |
| 4,620,993 | 11/1986 | Suss et al. . |
| 4,620,994 | 11/1986 | Suss et al. . |
| 4,650,718 | 3/1987 | Simpson et al. . |
| 4,659,770 | 4/1987 | Vasta . |
| 4,665,128 | 5/1987 | Cluff et al. . |
| 4,680,204 | 7/1987 | Das et al. . |
| 4,681,811 | 7/1987 | Simpson et al. . |
| 4,692,481 | 9/1987 | Kelly . |
| 4,710,543 | 12/1987 | Chattha et al. . |
| 4,713,427 | 12/1987 | Chattha et al. . |
| 4,719,132 | 1/1988 | Porter, Jr. . |
| 4,727,100 | 2/1988 | Vasta . |
| 4,741,780 | 5/1988 | Atkinson ................................ 106/448 |
| 4,752,532 | 6/1988 | Starka . |
| 4,764,430 | 8/1988 | Blackburn et al. . |
| 4,770,706 | 9/1988 | Pietsch . |
| 4,789,400 | 12/1988 | Sciodar et al. . |
| 4,798,745 | 1/1989 | Martz et al. . |
| 4,798,746 | 1/1989 | Claar et al. . |
| 4,808,656 | 2/1989 | Kania et al. . |
| 4,820,751 | 4/1989 | Takeshita et al. . |
| 4,840,674 | 6/1989 | Schwarz . |
| 4,853,037 | 8/1989 | Johnson et al. . |
| 4,883,838 | 11/1989 | Jung et al. . |
| 4,908,397 | 3/1990 | Barsotti et al. . |
| 4,914,148 | 4/1990 | Hille et al. . |
| 4,927,868 | 5/1990 | Schimmel et al. . |
| 4,975,474 | 12/1990 | Barsotti et al. . |
| 4,994,520 | 2/1991 | Mori et al. . |
| 5,008,335 | 4/1991 | Pettit, Jr. . |
| 5,017,435 | 5/1991 | Barsotti et al. . |
| 5,026,755 | 6/1991 | Kveglis et al. . |
| 5,051,464 | 9/1991 | Johnson . |
| 5,064,719 | 11/1991 | Den Hartog et al. . |
| 5,066,733 | 11/1991 | Martz et al. . |
| 5,076,843 | 12/1991 | Acitelli et al. . |
| 5,093,391 | 3/1992 | Barsotti et al. . |
| 5,093,407 | 3/1992 | Komai et al. . |
| 5,100,470 | 3/1992 | Hindagolla et al. . |
| 5,106,417 | 4/1992 | Hauser et al. . |
| 5,109,055 | 4/1992 | Nagasaki et al. . |
| 5,114,477 | 5/1992 | Mort et al. . |
| 5,122,552 | 6/1992 | Johnson . |
| 5,130,004 | 7/1992 | Johnson et al. . |
| 5,130,363 | 7/1992 | Scholl et al. . |
| 5,141,556 | 8/1992 | Matrick . |
| 5,152,801 | 10/1992 | Altermatt et al. . |
| 5,159,009 | 10/1992 | Wolff et al. . |
| 5,168,106 | 12/1992 | Babcock et al. . |
| 5,173,111 | 12/1992 | Krishnan et al. . |
| 5,179,191 | 1/1993 | Jung et al. . |
| 5,182,355 | 1/1993 | Martz et al. . |
| 5,184,148 | 2/1993 | Suga et al. . |
| 5,190,582 | 3/1993 | Shinozuka et al. . |
| 5,200,164 | 4/1993 | Medalia et al. ........................ 423/265 |
| 5,204,404 | 4/1993 | Werner, Jr. et al. . |
| 5,206,295 | 4/1993 | Harper et al. . |
| 5,221,581 | 6/1993 | Palmer et al. . |
| 5,229,452 | 7/1993 | Green et al. . |
| 5,232,974 | 8/1993 | Branan, Jr. et al. . |
| 5,236,992 | 8/1993 | Bush . |
| 5,242,751 | 9/1993 | Hartman . |
| 5,266,361 | 11/1993 | Schwarte et al. . |
| 5,266,406 | 11/1993 | Den Hartog et al. . |
| 5,276,097 | 1/1994 | Hoffmann et al. . |
| 5,281,261 | 1/1994 | Lin ........................ 106/20 R |
| 5,286,286 | 2/1994 | Winnik et al. . |
| 5,288,788 | 2/1994 | Shieh et al. . |
| 5,290,848 | 3/1994 | Palmer et al. . |
| 5,302,197 | 4/1994 | Wickramanayke et al. . |
| 5,310,778 | 5/1994 | Shor et al. . |
| 5,314,945 | 5/1994 | Nickle et al. . |
| 5,314,953 | 5/1994 | Corcoran et al. . |
| 5,319,044 | 6/1994 | Jung et al. . |
| 5,320,738 | 6/1994 | Kaufman . |
| 5,324,790 | 6/1994 | Manring . |
| 5,334,650 | 8/1994 | Serdiuk et al. . |
| 5,336,716 | 8/1994 | Kappes et al. . |
| 5,336,753 | 8/1994 | Jung et al. . |
| 5,352,289 | 10/1994 | Weaver et al. . |
| 5,356,973 | 10/1994 | Taljan et al. . |
| 5,366,828 | 11/1994 | Struthers . |

OTHER PUBLICATIONS

V. A. Garten et al., "Nature Of Chemisorptive Mechanisms In Rubber Reinforcement", Commonwealth Scientific and Industrial Research Organ., Div. Of Industrial chem., Melbourne, Australia, pp. 596–609. Date Unknown.

J. W. Watson, "Chemical Aspects Of Reinforcement", Compounding Research Dept., Dunlop Research Center, Dunlop Rubber Co., pp. 987–999. (Date Unkown).

K. Ohkita, et al., "The Reaction Of Carbon Black Surface With 2,2–Diphenyl–1–picrylhydraxyl", CAR, vol. 10, No. 5, (1972) PP. 631–636. (No month).

M. L. Studebaker et al., "Oxygen–Containing Groups On The Surface Of Carbon Black", Industrial and Eng. and chem., vol. 48, No. 1, pp. 162–166. (Date Unkown).

T. Yamaguchi et al., "Novel Carbon Black/Rubber Coupling Agent", Kautschuk and Gummi, Kunststoffe 42, Jahrgang Nr. May 1989, pp. 403–409.

J. B. Donnet et al., "Aroxylic Structure Of The Quinone Groups And Of The Free Radicals Present On Carbon Black Surfaces", Rev. Gen. Caoutchous Plasticques, vol. 42, No. 3, (1965), pp. 389–392. (w/Abstract).

J. B. Donnet et al., "Radical Reactions And surface Chemistry Of Carbon Black", Bull. Soc. Chim. (1960) (Abstract only). (no month).

RAPRA Abstract 432845: Compounding Heat Resistant Non–Black EPDM Rubber, PPG Industries. (Date unknown).

RAPRA Abstract 417612, D. C. Edwards, "Review: Polymer–Filler Interactions In Rubber Reinforcement", J. Mat. Sci., vol. 25. No. 10, (1990) pp. 4175–4185.

Gregory, Peter, "Ink Jet Printing", High–Technology Applications of Organic Colorants, Chapter 9, (1991). (no month).

RAPRA Abstract 403202, D. Siller, "Organotitanate, Zirconate Effect On Elastomers", Rubb. Plast. News, vol. 19, No. 24, (1990), pp. 14–27.

RAPRA Abstract 390600, H. Okamoto, "Application Of Coupling Agents To Elastomers", Nippon Gomu Kyokaishi, vol. 62, No. 12, (1989) pp. 819–833.

RAPRA Abstract 394030, P. Flink et al., "Mechanical Properties Of Natural Rubber/Grafted Cellulose Fibre Composites", Brit. Polym. J., vol. 22, No. 2, 1990, pp. 147–153.

Tsubokawa et al., "Grafting Onyo Carbon Black Having Few Functional Group" Shikizai Kyokaisha, vol. 66, No. 5, (1993) (Abstract Only).

R. H. Leach et al., "The Printing Processes", The Printing Ink Manual, Chapter 2, Fourth Edition. (Date unknown).

R. H. Leach et al., "Gravure Inks", The Printing Ink Manual, Chapters 8–10, Fifth Edition (1988). (No month).

N. Tsubokawa, "Functionalization Of Carbon Black By Surface Grafting Of Polymers", Dept. Of Material and Chemical Eng., pp. 417–470. (Date unknown).

"Ink Jet Printing: 1994 Overview and Outlook Supplied", Chapter 7.
Andreattola, Ink Jet Ink Technology, pp. 533–534. (no month).
Major, Michael J., "Formulating The Future of Automotive Coatings", Modern Paint and Coatings, pp. 34–36, (1992). (no month).
Greenfield, David, "Fewer Formulation Options Lead to Emphasis on Familiar", Modern Paint and Coatings, pp. 40–42, (1992). (no month).
Schrantz, Joe, "Automotive Coatings", Modern Paint and Coatings pp. 22–31, (1994). (no month).
"Regulations Focus Formulator Attention on Additives", Modern Paint and coatings, pp. 32–36, (1994). (no month).
Sherrer, Robert, "Coloration Of Ink Jet Inks", BLS Ink Jet Printing Conference, Oct. 10–12, (1994), Monterey CA.
Allen, Ross, "Thermal Ink Jet Printing Trends and Advances", BLS Ink Jet Printing Conference, Oct. 10–12, (1994), Monterey, CA.
Schneider, John, "Continuous Ink Jet", BLS Ink Jet Printing Conference Oct. 10–12 (1994) Monterey, CA.
Abstract 388935, R. Mushack, "Light–Colored Fillers In Polymers", Gummi Fas. Kinst., vol. 42, No. 11, (1989), pp. 584–592.
Abstract 301034, J. Y. Germain et al., et al., "Carbon Black Is Better with Silica" Rubb. World, vol. 193, No. 1, (1985), pp. 51–54.
Abstract 343229, "white And Black Fillers For Rubber Compounds", Ind. d. Gomma, vol. 30, No. 12, (1986) pp. 23–54.
Abstract 177481, L. Corbelli, "Ethylene–Propylene Rubbers", London Applied Science Publishers Ltd., (1981) Chapter 4, pp. 87–129. (no month).
Abstract 105623, G. Sugerman et al., "Putting Performance Into Thermosets With Titanium Coupling Agents", Cleveland, Ohio, (1976), pp. 106–113. (no month).
Abstract 056893, N. W. Ranney et al., "Applications for Silane Coupling Agents In The Automotive Industry", Kaut. U. Gummi Kunst., vol. 28, No. 10, (1975), pp. 597–608.

Abstract 002608, H. E. Haxo et al., "Ground Rice Hull Ash As A Filler For Rubber", Philadelphia, Paper No. 8, (1974), pp. 41, Preprint .012. (no month).
Abstract 000937, G. M. Cameron et al., "Reduction Of Hear Building–Up In Mineral–Filled Elastomers Through The Use Of Silane Coupling Agnets", Gothenburg, (44) (1973) Ser. Sec. 012. (no month).
Abstract 86056110, "Putting Performance Into thermosets With Titanium Coupling Agnets", G. Sugerman et al., High Performance Plast. National Tech. Conference, Soc. Plast. Eng. (Date unknown).
Derwent Publications Ltd., Database WPI Week 8002, AN 80–03330C; SU,A,659 523, Apr. 1979, Abstract.
Derwent Publications Ltd., Database WPI Week 9423, AN 94–189154; JP 61–28517A, May 1994, Abstract.
Derwent Publications Ltd., Database WPI Week 9524, AN 95–183086; JP,A,07 102 116, Apr. 1995, Abstract.
Patent Abstracts of Japan, vol. 95, No. 4, JP,A,07 102116, Apr. 1995, Abstract.
Derwent Publications Ltd., Database WPI Week 8651, AN 86–335147; JP 61–250 042, Nov. 1986, Abstract.
PCT International Search Report, Application No. PCT/US 95/16195 Mailing Date: Apr. 19, 1996.
PCT International Search Report, Application No. PCT/US 95/16452, Mailing Date: Apr. 17, 1996.
PCT International Search Report, Application No. PCT/IB 95/01154, Mailing Date: Apr. 29, 1996.
PCT International Search Report, Application No. PCT/US 95/16281, Mailing Date: Apr. 26, 1996.
H. Zoheidi et al., "Role Of Oxygen Surface Groups In Catalysts Of Hydrogasification Of Carbon Black By Potassium Carbonate," Carbon vol. 25, No. 6, Jun. 1987, pp. 809–819.
J. D. Roberts et al., "Basic Principles Of Organic chemistry," p. 1080. (Date unknown).
J. Am. Chem. Soc. 1992, 114, 5883–5884 (no month).

CARBON BLACK PRODUCTS FOR COLORING MINERAL BINDERS

BACKGROUND OF THE INVENTION

1. Field of the Invention

This invention relates to mineral binder systems which contain a carbon black product as a colorant.

2. Discussion of Related Art

Mineral binder systems used to form items such as concrete, cement, mortar and exterior plaster formulations are often colored to enhance their aesthetic appeal. Coloring can be accomplished either by applying a suitable coating to the exposed surfaces or by adding small amounts of one or more pigments to the mineral binder system to uniformly color the mix. Since surface coatings are subject to peeling, fading and weathering, the latter method of coloring is preferred. The pigment or pigments can be added either to the dry mineral mix, for example, in the case of concrete to the cement-sand mixture, or to the water used to set such a mix.

Pigments which are suitable for coloring mineral binder systems which are exposed to outdoor conditions must 1) be alkali-resistance, 2) be lightfast, 3) be resistant to industrial atmospheres, and 4) weather at a comparable rate with the body in which it is mixed so that the appearance of the surface does not change substantially with time.

In addition, for ease of application, the pigment should be relatively dust-free, and should easily disperse in the mix to attain its maximum coloring power.

Black pigments are desirable colorants for use in mineral binder systems because a large variety of colors and color shades can be obtained by their use, either alone or in combination with other pigments. Black iron oxides are the most preferred black pigment, but carbon blacks are also used to a limited extent.

While carbon blacks exhibit excellent coloring properties, alkali-resistance, lightfastness and chemical stability, they are not preferred in mineral binder systems exposed to outdoor weathering. Weathering studies show that the surface appearance of bodies containing carbon black undesirably changes as the weathering process progresses. When the system contains only carbon black as the coloring pigment, the surface fades. When the carbon black is used in combination with other colorants, the appearance of the other colorants become more pronounced. This change in carbon black-pigmented mineral systems has been attributed to the leaching out and washing away of the carbon black pigment particles, which are very small relative to the other ingredients. This has limited its use in systems exposed to outdoor weathering.

Additionally, depending on the physical form in which it is supplied, carbon black can be either very dusty or very difficult to disperse. The process used for incorporating the carbon black into a binder system depends on both the form in which the pigment is supplied and the processing equipment available to the user. As produced, carbon blacks are powdery materials with bulk densities ranging from about 0.02 to 0.1 g/cc and are termed fluffy blacks. Such blacks are very dusty. Because of their low densities and large surface areas, the fluffy products are cohesive, have very poor conveying properties and are therefore difficult to bulk handle. For this reason fluffy products have limited utility, and are generally supplied in bagged form. Fluffy blacks are, however, dispersible and can develop their full coloring potential by relatively simple grinding procedures.

To improve the bulk handling properties of carbon blacks and reduce their dustiness, fluffy blacks are typically densified by various pelletizing procedures to attain bulk densities ranging from about 0.2 to 0.7 g/cc. For a given grade of carbon black, handling properties tend to improve with increasing degrees of densification. Dispersibility, on the other hand, is progressively degraded as the extent of densification is increased. Thus there is a tradeoff between improvement in bulk handling properties and degradation in dispersibility. Because of the advantages of increased cleanliness, however, pelletized carbon blacks are often used for introducing carbon blacks into mineral binder systems. In such cases, however, the extent of grinding or milling required to form a uniform, intimate mix will be greater than that which is employed with the fluffy form of the product.

Carbon black has been added to mineral binder systems in a variety of ways. It can be milled into the dry sand-cement mixture, for example, and then the requisite amount of water necessary for setting the mix can be added. Alternately, an aqueous dispersion of the carbon black, in all or part of the requisite volume of water necessary for setting the mix, can be uniformly blended into the sand-cement mixture. In either case, for full and uniform color development, the carbon black agglomerates must be broken down to yield primarily individual aggregates (the smallest dispersible units of carbon black). This is accomplished either by milling the dry mix or by predispersing, by milling, the carbon black in the aqueous medium. Since carbon blacks tend to be hydrophobic, surface active agents are often used to promote wetting. In addition, the presence of such an agent in the aqueous medium can enhance the dispersion process and aid dispersion stabilization.

Attempts have been made to improve both the weathering and dispersing properties of carbon blacks used to pigment mineral binder systems. For example, U.S. Pat. No. 4,006, 031 discloses that fluorine-containing wetting agents used with carbon blacks provides improved weathering properties to mineral binder systems. Others, as described in European Patent No. 50354, have used surface-active polymers which disperse the carbon black in the aqueous medium used to set the mineral binder system and then become inactive after drying. The benefits include better black dispersion, improved weathering resistance and decreased efflorescence. The disclosure of these patents is herein incorporated by reference.

Nevertheless, even in these prior art processes, the carbon black, whether in fluffy or pelletized form, must be milled attain the required degree of pigment dispersion. Thus, there remains a need for carbon blacks useful as colorants in mineral binder systems which can be used in pelletized form, yet easily disperse with low shear stirring and less readily wash out of the system during weathering.

SUMMARY OF THE INVENTION

The present invention relates to a mineral binder composition having incorporated therein carbon black products comprising a carbon black having attached an organic group containing an ionic or an ionizable group. The carbon black products, when incorporated in a mineral binder system, offer superior weathering properties relative to conventional carbon black products.

DESCRIPTION OF THE PREFERRED EMBODIMENTS

The present invention relates to a mineral binder composition having incorporated therein carbon black products comprising a carbon black having attached an organic group containing an ionic or an ionizable group. The carbon black products, when incorporated in a mineral binder system, offer superior weathering properties relative to conventional carbon black products.

Suitable mineral binder systems include concrete, cement, mortar, and exterior plaster formulations. Other mineral binder systems are similarly useful herein. Any conventionally known additives for mineral binder systems may be incorporated in the mineral binder systems of the present invention.

The carbon black products may be prepared by reacting a carbon black with a diazonium salt in a liquid reaction medium to attach at least one organic group to the surface of the carbon black. The diazonium salt may contain the organic group to be attached to the carbon black. According to the invention, a diazonium salt is an organic compound having one or more diazonium groups. Preferred reaction media include water, any medium containing water, and any medium containing alcohol. Water is the most preferred medium. These carbon black products and various methods for their preparation are described in a U.S. patent application entitled "Reaction of Carbon Black with Diazonium Salts, Resultant Carbon Black Products and Their Uses," filed Dec. 15, 1994 and incorporated herein by reference.

To prepare the above carbon black products, the diazonium salt need only be sufficiently stable to allow reaction with the carbon black. Thus, that reaction can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

The carbon black can be reacted with a diazonium salt when present as a dilute, easily stirred, aqueous slurry, or preferably in the presence of the proper amount of water for carbon black pellet formation.

A preferred set of organic groups which may be attached to the carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group or a $C_1$–$C_{12}$ alkyl group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group or the alkyl group of the organic group is directly attached to the carbon black. The aromatic group may be further substituted or unsubstituted, for example, with alkyl groups. The $C_1$–$C_{12}$ alkyl group may be branched or unbranched and is preferably ethyl. More preferably, the organic group is a phenyl or a naphthyl group and the acidic group is a sulfonic acid group, a sulfinic acid group, a phosphonic acid group, or a carboxylic acid group. Examples include —COOH, —$SO_3H$ and —$PO_3H_2$ and their salts, for example —COONa, —COOK, —COO$^-$$NR_4^+$, —$SO_3$Na, —HPO$_3$Na, —$SO_3^-$ $NR_4^+$, and PO$_3$Na$_2$, where R is an alkyl or phenyl group. Particularly preferred ionizable substituents are —COOH and —$SO_3H$ and their sodium and potassium salts.

Most preferably, the organic group is a substituted or unsubstituted sulfophenyl group or a salt thereof; a substituted or unsubstituted (polysulfo)phenyl group or a salt thereof; a substituted or unsubstituted sulfonaphythyl group or a salt thereof; or a substituted or unsubstituted (polysulfo)naphthyl group or a salt thereof. A preferred substituted sulfophenyl group is hydroxysulfophenyl group or a salt thereof.

Specific organic groups having an ionizable functional group forming an anion are p-sulfophenyl, 4-hydroxy-3-sulfophenyl, and 2-sulfoethyl.

Quaternary ammonium groups (—$NR_3^+$ and quaternary phosphonium groups (—$PR_3^+$) represent examples of cationic groups and can be attached to the same organic groups as discussed above for the ionizable groups which form anions. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and quaternized aromatic amines, can also be used as the organic group. Thus, N-substituted pyridinium compounds, such as N-methyl-pyridyl, can be used in this regard.

An advantage of the carbon black products having an attached organic group substituted with an ionic or an ionizable group is that the carbon black products may have increased water dispersibility relative to the corresponding untreated carbon black. In general, water dispersibility of the carbon black products increases with the number of organic groups attached to the carbon black having an ionizable group or the number of ionizable groups attached to a given organic group. Thus, increasing the number of ionizable groups associated with the carbon black products should increase their water dispersibility and permits control of the water dispersibility to a desired level.

When water dispersible carbon black products of the present invention are prepared, it is preferred that the ionic or ionizable groups be ionized in the reaction medium. The resulting product solution or slurry may be used as is or diluted prior to use. The carbon black products may be pelletized, preferably by a conventional wet process, pin pelletizing operation.

The carbon black products may be dried by techniques used for conventional carbon blacks. These techniques include, but are not limited to, drying in ovens and rotary kilns. Overdrying, however, may cause a loss in the degree of water dispersibility. In the event that the carbon black products above do not disperse in the aqueous vehicle as readily as desired, the carbon black products may be dispersed using conventionally known techniques such as milling or grinding.

The carbon black products may be incorporated either in solid form or as a preformed liquid dispersion. The preferred addition of carbon black product is of an amount less than or equal to 5% by weight of the mineral binder. These mineral binder systems have improved weathering properties as shown in the Examples below.

Experimental

The carbon blacks used were characterized with respect to their structure using n-dibutyl phthalate absorption, DBP, using ASTM D 2414. Surface area was characterized by adsorption of cetyltrimethylammonium bromide, CTAB, using ASTM D 3765.

Pin Pelletizing

Pin Pelletizing was accomplished using both a pilot scale continuous and a laboratory scale batch pin pelletizer. The batch unit consisted of an 18-cm (7-inch) diameter by 17-cm long cylinder containing a central shaft fitted with a plurality of pins extending almost to the cylinder wall. The shaft was rotated at about 500 RPM during the pelletizing operation. The continuous unit consisted of a 25.5-cm (10-inch) diameter by 155-cm (61-inch) long cylindrical body fitted with a rotor running along its axis. The rotor, fitted with about 120 1.27-cm (0.5-inch) diameter pins extending almost to the walls of the unit, was rotated at a specified RPM to form pellets.

Measurement of Aqueous Residue

This procedure was used to obtain a measure of product dispersibility. The carbon black (5 g) was vigorously shaken with 45 g of water for 5 minutes. The resulting slurry was poured through a 325 mesh (44 micron) screen and rinsed with water until the washings were colorless. The dried weight of residue on the screen was determined and expressed as a percentage of the carbon black used in the test.

Product Dispersibility

A measure of product dispersibility was obtained by dispersing the various blacks in an aqueous medium having a pH of about 10 under low shear conditions by means of a magnetic stirrer for 30 minutes. For the control, unmodified blacks, cetyl trimethyl amonium bormide, a surfactant known to stabilize carbon black dispersions, was added to the medium. No surfactant was used in the case of the carbon black products. The slurry optical density, $(OD)_{low\ shear}$, was determined at a wavelength of 550 nm. Thereafter, the slurry was sonified (to reflect intense milling) and the slurry optical density, $(OD)_{sonified}$, determined. The percent change in optical density before and after sonification, $\Delta(OD)=100[(OD)_{sonified}-(OD)_{low\ shear}]/(OD)_{sonified}$ was calculated. A large percent change in this value indicates poor low shear dispersibility for the dispersion conditions employed.

Colored Concrete Formulation

Concrete was colored with a mixture of carbon black and natural red iron oxide pigment. Two procedures were used to introduce the black into the concrete mix. All quantities cited are in parts by weight. In the first procedure, 90 parts of red iron oxide and 6 parts of carbon black or the carbon black product were thoroughly mixed in a pestle and mortar until additional mixing gave no change in color. 1.4 parts of the mixed color was then mixed with 60 parts of sand and 14 parts of cement by spatula. Thereafter, about 10 parts water was added and the mixture was worked by spatula to form a paste. The paste was cast into channels (8.5 cm long×1 cm wide×1.5 cm deep) and allowed to slowly dry under ambient conditions. In the second procedure, all quantities used to form the colored concrete were identical with those in the first procedure. In this case, however, the carbon black or carbon black product, 0.0875 parts, was added to the water used to set the concrete. None was added to the red iron oxide. In all cases the blacks were dispersed in the water under low shear dispersion conditions by stirring for 30 minutes using a magnetic stirrer.

The reflectance spectrum of the dry, colored concrete was determined. The reflectance values were used to compute the International Commision on Illumination CIE 1976 L*, a* and b* values. L* represents the lightness coordinate running from 0 for a pure black to 100 for a pure white; a* represents the red-green coordinate with its value becoming larger as the degree of redness increases; b* represents the yellow-blue coordinate with its value becoming larger as the degree of yellowness increases.

Weathering

Weathering was simulated by contacting the concrete for 30 seconds with undiluted SURE CLEAN® 600 detergent supplied by ProSoco, Inc., Kansas City, Kans. The product is a blend of organic and inorganic acids combined with wetting agents and is normally diluted with water and employed to clean new masonry. The concrete was then washed with copious amounts of distilled water, dried and then its surface reflectance redetermined. The neat, undiluted product vigorously attacks and alkaline concrete so that some of the surface layers are washed away. Changes in L*, a* and b* ($\Delta$L*, $\Delta$a* and $\Delta$b*) before and after treatment give a measure of preferential leaching.

EXAMPLES

Example 1

This example illustrates the preparation of a carbon black product having an attached $p-C_6H_4SO_3^-$ group. A fluffy carbon black (200 g) having a CTAB surface area of 350 $m^2/g$ and a DBP of 120 cc/100 g carbon and 42.4 g sulfanilic acid were placed in the batch pin pelletizer. After mixing for 40 seconds by means of the rotor, a solution of 20.7 of sodium nitrite, $NaNO_2$, in 150 g water was added to the pelletizer. 4-Sulfobenzene diazonium hydroxide inner salt is formed in situ which reacts with the carbon black. After mixing for 45 seconds by means of the rotor, the carbon black product was transformed into pellets. These were dried in an oven at 120° C. The pelletized product had handling properties at least comparable to conventionally pelletized carbon blacks and was dispersible. Using the aqueous residue test, it has a 325 mesh residue of 0.6% compared to 97% for the untreated, fluffy black.

A sample of the product was subjected to Soxhlet extraction overnight with tetrahydrofuran. Analysis of the extracted sample showed that it contained 3.47% sulfur, compared to 0.5% sulfur for the untreated fluffy carbon black. Therefore, the carbon black product has 0.93 mmol/g of attached $p-C_6H_4SO_3^-$ groups.

Example 2

This example illustrates the preparation of a carbon black product having an attached $p-C_6H_4CO_2^-$ group. Stock solutions A and B were formed as follows:

Stock solution A: 19 g of concentrated hydrochloric acid (about 36% HCl) and 20 g water Stock solution B: 8.0 g $NaNO_2$ and 39.2 g water The stock solutions were chilled to 5° C. To 10.3 g of stock solution A 1.58 g of anthranilic acid (o-amino benzoic acid) was added. Thereafter, 10.5 g of stock solution B was slowly added while ensuring that the temperature did not exceed 10° C. The resulting solution, kept in an ice bath, was stirred for 15 minutes. It was then added to a slurry of 20 g of the fluffy black used in Example 1 in 350 ml water. The resulting slurry was stirred for 15 minutes and then filtered. The filter cake was washed twice with water and then dried in an oven at 110° C. While this product was not pelletized, the dried cake had a density which was comparable to that of the pelletized product and had much better handling properties that the fluffy precursor.

Dispersibility

The dispersibilities of the products of Examples 1 and 2 were evaluated using the optical density procedure. The controls employed were the untreated, fluffy black and its conventional dry drum pelletized counterpart. The percent change in optical density is presented in Table 1.

TABLE 1

Percent Change In Slurry Optical Densities On Sonification

| Product | $\Delta$ (OD), % |
|---|---|
| Example 1 | 26.8 |
| Example 2 | 91.4 |
| Fluffy Control | 92.4 |
| Dry Drum Pelletized Control | 100 |

The $\Delta$(OD) values in the table show that the products of Example 1 and Example 2 are more dispersible than the conventional dry drum pelletized product under low shear dispersion conditions. In spite of their much larger bulk densities, the dispersibility of the product of Example 2 is comparable to, and that of Example 1 substantially superior to, that of the undensified, fluffy black.

Evaluation of Concrete Colored with Carbon Black Samples

The products of Examples 1 and 2 as well as the fluffy and dry pelletized control blacks were used to form colored concrete using the pestle and mortar mixing process, Procedure I, and the low shear aqueous dispersion process, Procedure II. The L*, a* and b* valued found are given in Table 2.

TABLE 2

Color Values Attained In Concrete

| Products | Procedure I | | | Procedure II | | |
|---|---|---|---|---|---|---|
| | L* | a* | b* | L* | a* | b* |
| Example 1 | 23.20 | 2.57 | 3.63 | 21.18 | 1.97 | 3.00 |
| Example 2 | 21.71 | 2.01 | 2.41 | 28.76 | 4.95 | 5.75 |
| Fluffy | 27.53 | 2.99 | 3.54 | 40.85 | 1.86 | 2.69 |
| Dry Pelletized | 27.47 | 3.67 | 4.22 | 31.82 | 3.90 | 3.68 |

The results in Table 2 show that when the carbon products of this invention are incorporated into concrete by Procedure I, the pigmented concretes have darker colors, as shown by their smaller L* values, than the either dry pelletized or fluffy carbon blacks. With procedure II, where the blacks are dispersed under low shear conditions in water, the product of Example 1, being the most dispersible (see Table 1), gives the darkest color. The product of Example 2 forms the next darkest color. Surprisingly, the fluffy black, which is more dispersible than the dry drum pelletized product, gave a pigmented concrete with the lightest surface color. This is attributed to segregation of eh pigment away from the surface layers because, as will be shown, a much darker color is obtained when the surface is washed with the SURE CLEAN® detergent.

Weathering of Colored Concrete Samples

Simulated weathering was conducted by washing the surfaces of the samples characterized in Table 2 with the SURE CLEAN® 600 detergent and water. The acidic detergent, in all cases, attacked the surfaces of the samples. The L*, a* and b* values of the washed surfaces are presented in Table 3. The aggressive washing procedure employed, in all cases, resulted in some change in the appearance of the surface. The change in the appearance, however, was lowest for the carbon products of the present invention.

TABLE 3

Color Values Of Washed Concrete

| Products | Procedure I | | | Procedure II | | |
|---|---|---|---|---|---|---|
| | L* | a* | b* | L* | a* | b* |
| Example 1 | 22.10 | 3.06 | 6.21 | 21.00 | 2.46 | 5.58 |
| Example 2 | 20.69 | 2.52 | 5.24 | 25.49 | 5.22 | 8.11 |
| Fluffy | 24.33 | 3.66 | 6.29 | 28.22 | 2.20 | 5.43 |
| Dry Pelletized | 26.31 | 4.34 | 7.64 | 24.22 | 4.95 | 7.63 |

The changes in color values on washing are shown in Table 4.

TABLE 4

Change In Color On Washing

Color Values Attained In Concrete

| Products | Procedure I | | | Procedure II | | |
|---|---|---|---|---|---|---|
| | $\Delta$L* | $\Delta$a* | $\Delta$b* | $\Delta$L* | $\Delta$a* | $\Delta$b* |
| Example 1 | 1.10 | −0.49 | −2.58 | 0.18 | −0.49 | −2.58 |
| Example 2 | 1.02 | −0.51 | −2.83 | 3.27 | −0.27 | −2.36 |
| Fluffy | 3.20 | −0.67 | −2.75 | 12.63 | −0.34 | −2.74 |
| Dry Pelletized | 1.16 | −0.67 | −3.42 | 7.60 | −1.05 | −3.95 |

For each procedure used to form the concrete, the magnitude of the $\Delta$L* value is smallest for the carbons products of the present invention. Apart from the sample formed with the fluffy black using Procedure II where some color segregation occurred and the change in $\Delta$L* is very large, the magnitude of the $\Delta$a* values are smallest for the products of the present invention. Finally, the values of $\Delta$b* are reasonably comparable for all the samples. Accordingly, the present results show that the color changes are smallest with the black products of the present invention.

Example 3

The present example shows that the carbon black products can be formed in a continuous pelletizing operation. A fluffy carbon black having a surface area of 133 $m^2$/g and a DBP of 190 cc/100 g carbon was introduced into a continuously operating pin pelletizer at a rate of 100 parts by weight per hour. Simultaneously, a 30% solution of sodium nitrite and a suspension containing 5.43% concentrated nitric acid, 8.72% sulfanilic acid and 85.9% water were introduced into the pelletizer. The sodium nitrite solution and the suspension were introduced at rates of 16 and 112 parts by weight per hour, respectively. 4-Sulfobenzenediazonium hydroxide inner salt was generated in situ and reacted with the carbon black in the pelletizer. The material exiting the pelletizer is the treated black, in pelletized form, and was dried at 125° C. These materials may also be used in the mineral binder systems to obtain superior weathering properties.

Additional embodiments of the invention will be apparent to those skilled in the at from consideration of the specification and practice of the invention disclosed herein. The specification and examples are intended to be exemplary only.

The claimed invention is:

1. A mineral binder composition comprising a mineral binder and a carbon black product comprising a carbon black having attached an organic group containing an ionic or an ionizable group.

2. A composition of claim 1 wherein the carbon black product is a water dispersible carbon black product.

3. A composition of claim 2 wherein the carbon black product is dispersed in the mineral binder composition by means of low shear stirring or mixing.

4. A composition of claim 1 wherein the carbon black product is present in an amount of less than or equal to 5% by weight of the mineral binder.

5. A composition of claim 1 wherein the carbon black product is in pelletized form.

6. A composition of claim 1 wherein the mineral binder is concrete, cement, mortar, or plaster.

7. A composition of claim 1 wherein the ionic or the ionizable group is a carboxylic acid or a salt thereof.

8. A composition of claim 1 wherein the ionic or the ionizable group is a sulfonic acid or a salt thereof.

9. A composition of claim 1 wherein the organic group is a sulfophenyl group or a salt thereof.

10. A composition of claim 1 wherein the organic group is p-sulfophenyl or a salt thereof.

11. A composition of claim 1 wherein the organic group is a carboxyphenyl group or a salt thereof.

* * * * *